(12) United States Patent
Raab et al.

(10) Patent No.: US 7,874,154 B2
(45) Date of Patent: Jan. 25, 2011

(54) COOLING SYSTEM OF AN INTERNAL COMBUSTION ENGINE HAVING CHARGE AIR FEED

(75) Inventors: Gottfried Raab, Perg (AT); Peter Kislinger, Linz (AT); Heidrun Klinger, Steyr (AT)

(73) Assignee: MAN Nutzfahrzeuge Oesterreich AG, Steyr (AT)

( * ) Notice: Subject to any disclaimer, the term of this patent is extended or adjusted under 35 U.S.C. 154(b) by 599 days.

(21) Appl. No.: 11/901,512

(22) Filed: Sep. 18, 2007

(65) Prior Publication Data

US 2008/0066697 A1 Mar. 20, 2008

(30) Foreign Application Priority Data

Sep. 20, 2006 (DE) .................. 10 2006 044 820

(51) Int. Cl.
*F02B 29/04* (2006.01)
*F02B 33/44* (2006.01)
*F02B 33/00* (2006.01)
*F01P 9/00* (2006.01)
*F01P 7/02* (2006.01)

(52) U.S. Cl. .................. 60/599; 60/612; 123/563; 123/562; 123/41.01; 123/41.05

(58) Field of Classification Search .................. 60/599, 60/563, 605.2, 612; 123/41.01, 41.05, 563, 123/562; F02B 29/00, 29/04; F01P 3/20
See application file for complete search history.

(56) References Cited

U.S. PATENT DOCUMENTS

| 3,134,371 | A | * | 5/1964 | Crooks | 123/563 |
| 4,317,439 | A | * | 3/1982 | Emmerling | 123/563 |
| 5,598,705 | A | * | 2/1997 | Uzkan | 60/599 |
| 5,910,099 | A | * | 6/1999 | Jordan et al. | 60/599 |
| 6,789,512 | B2 | * | 9/2004 | Duvinage et al. | 123/41.05 |
| 6,848,397 | B2 | | 2/2005 | Haase | 123/41.01 |
| 7,254,947 | B2 | * | 8/2007 | Burk et al. | 60/599 |
| 7,310,946 | B2 | * | 12/2007 | Rogg et al. | 60/599 |
| 7,536,998 | B2 | * | 5/2009 | Held et al. | 123/563 |
| 2007/0186912 | A1 | * | 8/2007 | Holzbaur et al. | 123/563 |
| 2007/0277523 | A1 | * | 12/2007 | Muller et al. | 60/599 |
| 2009/0020079 | A1 | * | 1/2009 | Muller et al. | 123/563 |

FOREIGN PATENT DOCUMENTS

DE 3517567 A1 * 12/1985

(Continued)

*Primary Examiner*—Thai Ba Trieu
(74) *Attorney, Agent, or Firm*—Cohen Pontani Lieberman & Pavane LLP

(57) ABSTRACT

A method and a system for cooling an internal combustion engine having charge air feed, which has a first and a second cooling loop, of which the first cooling loop is operated at a higher temperature level than the second cooling loop, and in which the charge air feed has at least one intercooling unit which is thermally coupled to the second cooling loop, having a controllable coolant throughput. The system includes at least one shutdown element in the second cooling loop for throttling the coolant throughput in the second cooling loop to 0 (zero). Coolant throughput may be shut down during the operation of the internal combustion engine as a function of an operating parameter of a vehicle component.

14 Claims, 3 Drawing Sheets

FOREIGN PATENT DOCUMENTS

| | | |
|---|---|---|
| DE | 199 24 677 A1 | 8/2000 |
| DE | 101 39 315 A1 | 6/2003 |
| DE | 102 15 262 | 10/2003 |
| DE | 102006010247 A1 | 9/2007 |
| EP | 1 342 893 | 9/2003 |
| GB | 2023797 A * | 1/1980 |
| WO | WO 2004/090303 | 10/2004 |
| WO | WO 2005/012707 | 2/2005 |
| WO | WO 2005/061869 A1 | 7/2005 |

* cited by examiner

COOLING SYSTEM OF AN INTERNAL COMBUSTION ENGINE HAVING CHARGE AIR FEED

BACKGROUND OF THE INVENTION

1. Field of the Invention

The present invention relates to a method and a system for cooling an internal combustion engine having charge air feed. The system includes a first and a second cooling loop, wherein the first cooling loop is operated at a higher temperature level than the second cooling circuit, and the charge air feed has at least one intercooling unit which is thermally coupled to the second cooling loop, in which a cooling throughput is controllable.

2. Description of the Related Art

Modern internal combustion engines, in particular diesel engines, typically have intercooling for cooling the air required for charging the internal combustion engine. Intercooling is required on one hand because of the heating up of the turbocharger due to the exhaust gases of the engine. The above-mentioned heating is caused by the joint arrangement of the turbine and the compressor on one shaft and consequently the thermal contact of the two housings. This thermal contact causes a heat transfer from the exhaust gas turbocharger to the charge air compressor.

On the other hand, one has to consider that the air taken in by the charge air compressor is typically heated to a temperature of approximately 180° C. or, with two-stage compression, to an even higher temperature. The charge air taken in expands with rising temperature, which causes a reduction of the oxygen proportion per volume unit. This reduction of the oxygen proportion causes a lower performance increase of the engine. To counteract this effect, the intercoolers mentioned above are used particularly in motor vehicle engines. The use of an intercooler ensures that the heated air is cooled down and thus a higher charge density is provided to the combustion process in the cylinder. Due to the higher oxygen content of the charge air per volume unit, it is thus possible to combust a larger fuel quantity. This results in a further performance increase which may be approximately 30%. Simultaneously, the nitrogen oxide emission is reduced by the intercooling because lower combustion temperatures are also achieved due to the lower charge air entry temperature.

In this context, a cooling system for internal combustion engines having indirect intercooling is known from U.S. Pat. No. 6,848,397. In the cooling system described, two air-cooled heat exchangers and an intercooler are provided in a cooling loop. The cooling system has an aggregate cooling loop for cooling an internal combustion engine, which comprises a main cooling loop having a main coolant cooler and an auxiliary cooling loop for cooling an auxiliary medium. The auxiliary cooling loop branches off at a decoupling point from the main cooling loop and leads back thereto at a coupling point, which is situated between the main coolant cooler and a coolant delivery pump. In addition to the two above-mentioned coolers, an intercooler is provided for cooling the charge air fed to the internal combustion engine. The technical achievement of the object described above has the essential feature that the cooling loops are operable at different temperature levels and the coolant delivery pump is adjustable in regard to the volume flow to be delivered, the delivery performance, and/or the delivery pressure.

As a supplement to the publication cited above, for example, a cooling system for supercharged motor vehicle engines is known from DE 10 2006 010 247, in which the intercooling unit has a charge air intermediate cooler and a charge air main cooler. Because in this case the charge air is compressed in two stages, the charge air is cooled between the low-pressure compressor and the high-pressure compressor using the intermediate intercooler, while the main intercooler cools the charge air which has left the high-pressure compressor.

The previously described systems have the disadvantage that, in each case the cooling loop operated at a lower temperature level and into which the intercoolers are also coupled, for example, is supplied with coolant in all operating states, so that the corresponding engine components are cooled at all times during operation of the internal combustion engine. However, independently of the minimum coolant throughput in the low temperature cooling loop, there are operating states of the internal combustion engine, such as the starting phase or specific phases for regenerating exhaust gas treatment components, in which an elevated temperature is needed.

SUMMARY OF THE INVENTION

It is thus an object of the present invention to provide a cooling system for a supercharged internal combustion engine, in which the cooling of the internal combustion engine caused by the minimum throughput of the coolant in the low temperature cooling loop is reliably prevented in specific, selectable operating states. In particular, hot running phases of the internal combustion engines are to be shortened and a temporary increase of the charge air temperature level is to be reached within the shortest possible time, above all in regard to specific regeneration strategies of exhaust gas treatment components. The cooling system to be specified is to have a comparatively simple control technology design above all and is also to allow immediate reaction to changes of the operating parameters of the internal combustion engine, a downstream exhaust gas treatment system, and/or the status variables in the cooling loops.

The above-mentioned object is achieved by providing a cooling system for an internal combustion engine having charge air feed, which has a first and a second cooling loop, of which the first cooling loop is operated at a higher temperature level than the second cooling loop and in which the charge air feed has at least one intercooling unit, which is thermally coupled to the second cooling loop, which has a controllable coolant throughput. At least one shutdown element is provided in the second cooling loop using which the coolant throughput in the second cooling loop may be throttled to 0 (zero), i.e., may be shut down, during operation of the internal combustion engine as a function of an operating parameter of a vehicle component and/or other influencing variables, such as the ambient temperature. In addition, there is disclosed a method for cooling an internal combustion engine, which is charged with charge air via a charge air feed, in which a coolant is circulated in a first and a second cooling loop, the first cooling loop being operated at a higher temperature level than the second cooling loop and the charge air feed having at least one intercooling unit, which transfers heat from the charge air to the second cooling loop, in which a coolant throughput is regulated. The coolant throughput in the second cooling loop is throttled to 0 (zero), i.e., is shut down during operation of the internal combustion engine as a function of an operating parameter or a state change of a vehicle component and/or other influencing variables, such as the ambient temperature.

According to the present invention, a cooling system of an internal combustion engine having charge air feed, which has a first and a second cooling loop, of which the first cooling loop is operated at a higher temperature level than the second cooling loop and in which the charge air feed has at least one intercooling unit which is thermally coupled to the second cooling loop, which has a controllable coolant throughput, has been refined in such a way that at least one shutdown element is provided in the second cooling loop. With this shut down valve the coolant throughput in the second cooling loop may be throttled to zero, i.e., may be shut down, during operation of the internal combustion engine as a function of an operating parameter or a state change of at least one vehicle component and/or other influencing variables. The shutdown of the second cooling loop, i.e., the low temperature cooling loop, preferably occurs as a function of an operating parameter or a state change of the internal combustion engine, one of the cooling loops, and/or at least one component of an exhaust gas treatment system.

The present invention described above is thus distinguished in particular that the coolant throughput in the low temperature loop may be shut down completely as a function of operating parameters or state changes of specific vehicle components, for example, of the internal combustion engine, the cooling system, or an exhaust gas treatment system, which are selectable or storable in a central control unit. Using the cooling system according to the present invention, it is possible, even during the operation of the internal combustion engine, to completely shut down the otherwise typical coolant minimum throughput in the low temperature loop at least temporarily as a function of a predefinable, operationally-specific decision criterion. In this way, in specific operating states, which have been previously established, the cooling of the engine, and of specific vehicle components thermally coupled to the low temperature loop, such as the components of an exhaust gas treatment system, which is otherwise caused by the minimum coolant throughput, is reliably suppressed.

In an advantageous embodiment of the present invention, the cooling system is combined with a two-stage charge air compression. In this embodiment the charge air feed has a low-pressure compressor and a high-pressure compressor and the intercooling unit has an intermediate intercooler and a main intercooler. The intermediate intercooler is connected between the low-pressure compressor and the high-pressure compressor in the flow direction of the charge air, while the main intercooler is connected downstream from the high-pressure compressor. In this context, it is advantageous to connect a thermostat valve downstream from the intermediate intercooler and/or the main intercooler in the low temperature coolant loop, so that the coolant throughput through the two coolers is controllable as a function of the temperature or temperatures occurring in the second cooling loop in the flow direction of the coolant after the intercoolers.

Furthermore, in another advantageous embodiment, the shutdown element provided in the second cooling loop includes a pressure relief valve. With the aid of the pressure relief valve, a pressure limiting function is integrated in the second cooling loop, so that if needed, the air-cooled low temperature heat exchanger in particular, i.e., the heat exchanger, via which heat is transferred from the second cooling loop to the environment, is protected from impermissible pressure spikes.

In addition to the previously described cooling system, the present invention also relates to a method of cooling an internal combustion engine. The internal combustion engine is charged with charge air via a charge air feed and the coolant is circulated in a first and a second cooling loop. The first cooling loop is operated at a higher temperature level than the second cooling loop and the charge air feed has at least one intercooling unit, which transfers heat from the charge air to the second cooling loop, whose coolant throughput is preferably regulated as a function of vehicle-specific operating parameters. The method according to the present invention is characterized in that during operation of the internal combustion engine, the coolant throughput in the second cooling loop is throttled to zero, i.e., the coolant throughput is shut down as a function of an operating parameter or a state change of a vehicle component and/or other influencing variables. Preferably, the shutdown occurs as a function of an operating parameter or a state change of the internal combustion engine, at least one of the cooling loops, and/or as a function of at least one component of an exhaust gas treatment system.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The present invention is described in greater detail in the following with reference to the drawings in which.

DETAILED DESCRIPTION OF THE PRESENTLY PREFERRED EMBODIMENTS

Figure 1:
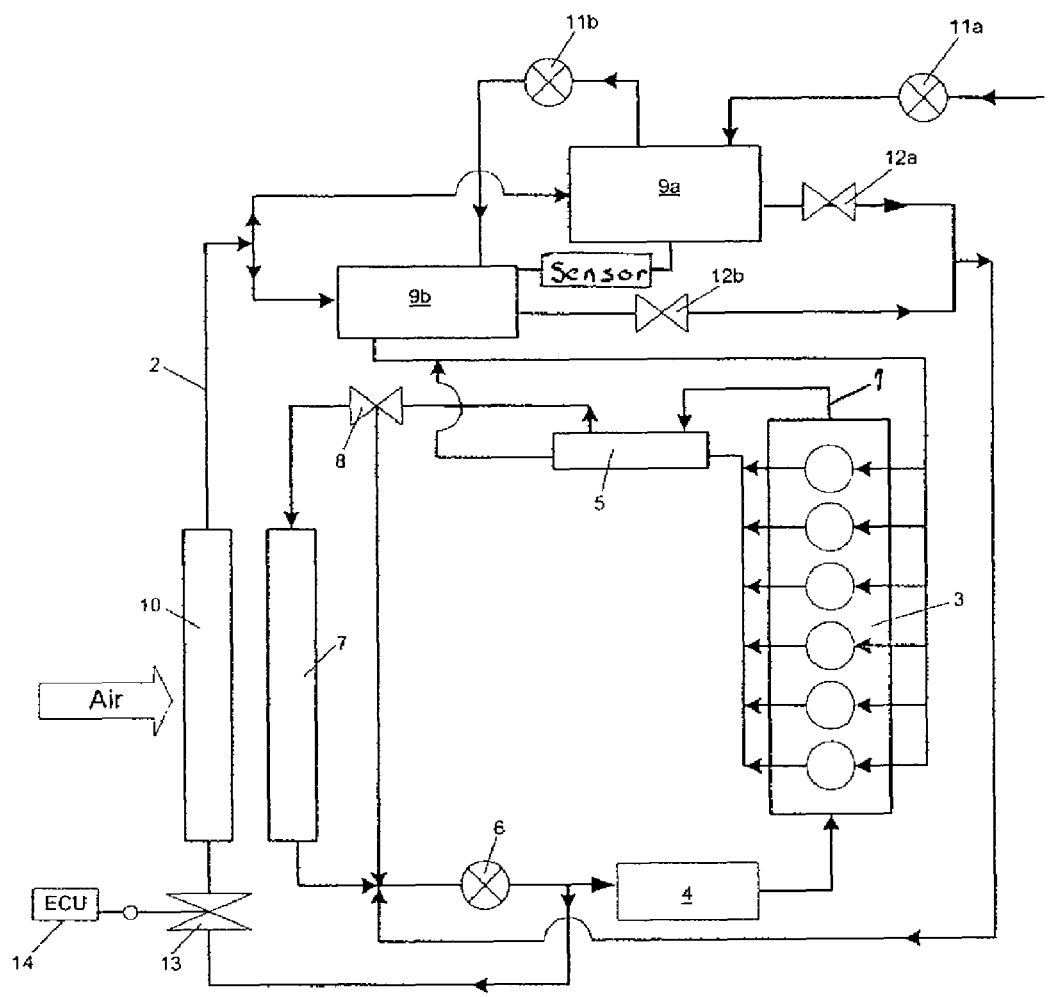
FIG. 1: shows a cooling system having a high and a low temperature cooling loop and a shutdown element in the low temperature cooling loop.

FIG. 1 shows a cooling system according to the present invention having a first cooling loop 1 designed as a high-temperature cooling loop and a second cooling loop 2 designed as a low-temperature cooling loop. In the exemplary embodiment shown of a motor vehicle cooling system, for example, as is used in modern utility vehicles, in particular in trucks and buses, an internal combustion engine 3, an oil heat exchanger 4, an exhaust gas heat exchanger 5, a coolant pump 6, and an air-cooled high-temperature heat exchanger 7 are hydraulically and thermally incorporated in the high-temperature cooling loop 1. Heat is dissipated from the above-mentioned vehicle components and transferred via the high-temperature heat exchanger 7 to the ambient air via the coolant conveyed in the first cooling loop 1, i.e., the high-temperature cooling loop.

A thermostat 8 is provided inside the first cooling loop 1, which thermostat regulates the coolant throughput through the high-temperature heat exchanger. Furthermore, the cooling system shown in FIG. 1 has a second cooling loop 2, implemented as a low temperature cooling loop, in which primarily an intercooling unit 9 and an air-cooled low temperature heat exchanger 10 are thermally and hydraulically incorporated. In this second cooling loop 2, the coolant is cooled to a temperature significantly below the coolant temperature in the cooling loop 1 during operation of the internal combustion engine 3.

To attain optimum charging of the internal combustion engine 3, a two-stage compression of the charge air is provided, which includes a low-pressure compressor 11a and a high-pressure compressor 11b. The charge air is cooled using an intercooling unit, which includes an intermediate intercooler 9a and a main intercooler 9b. The intermediate intercooler 9a and the main intercooler 9b are hydraulically incorporated in parallel into the second cooling loop 2 and cool the charge air in that the charge air leaving the low-pressure compressor 11a flows through the intermediate intercooler 9a and the charge air leaving the high-pressure compressor 11b flows through the main intercooler 9 b.

A thermostat regulating valve 12a, 12b, for controlling the distribution of the coolant throughput within the intercooling unit is connected hydraulically downstream in each case from the intermediate intercooler 9a and the main intercooler 9b in the second cooling loop 2.

Furthermore, a valve, which is implemented as a shutdown element 13, is connected upstream of the air-cooled low temperature heat exchanger 10 when viewed in the flow direction of the coolant in the second cooling loop 2. As a function of an operating parameter or state change of a vehicle component and/or other influencing variables, the coolant throughput may be shut down. In this way, the minimum throughput may be reduced to 0, for example, during light load operation or the starting phase of the internal combustion engine 3. Undesired cooling of the internal combustion engine 3 or lengthening of the warm-up phase because of the typically provided coolant minimum throughput is thus reliably prevented.

Figure 3:
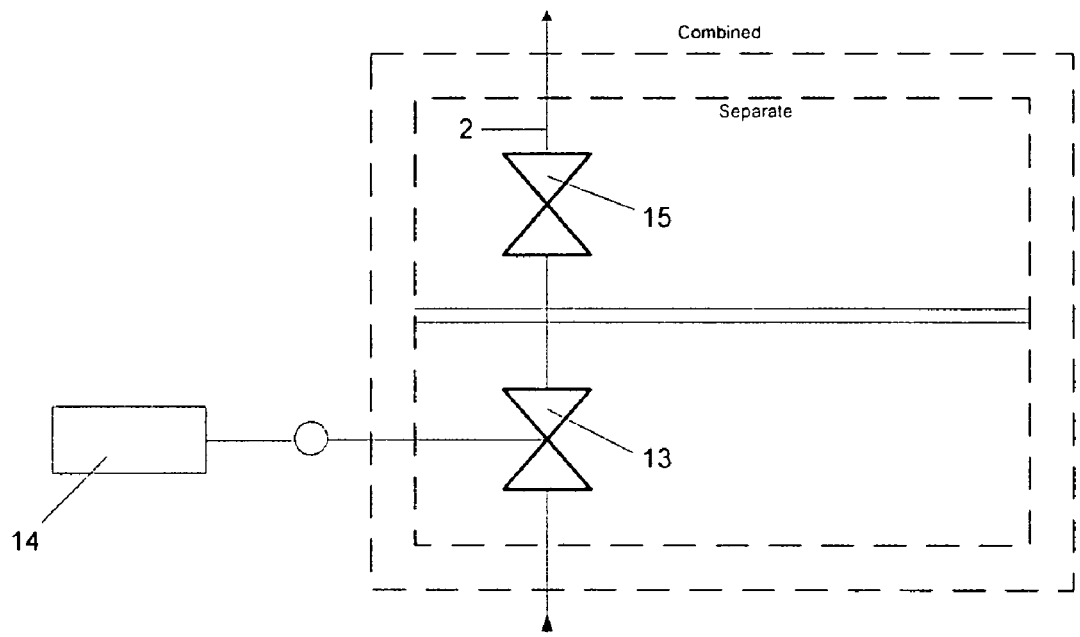
FIG. 3: is a partial view of FIG. 1 showing the shutdown element separate from and in combination with a device for reducing pressure.
Figure 4:
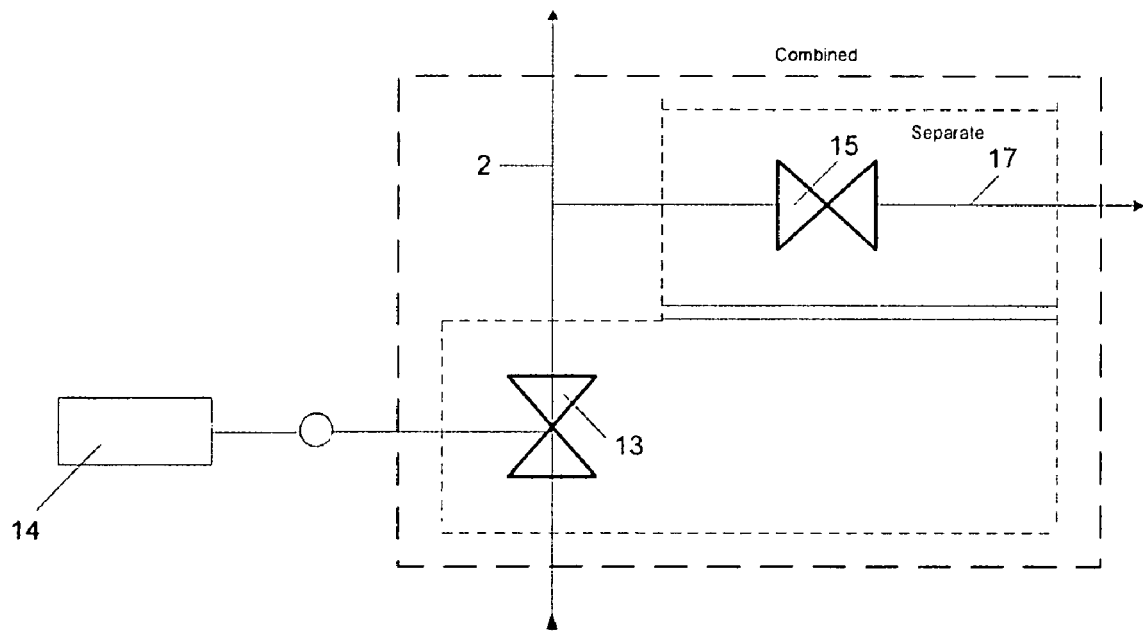
FIG. 4: is a partial view of FIG. 1 showing the shutdown element separate from and in combination with a device for reducing pressure and a bypass line towards the suction side of the coolant pump.

In addition, as schematically shown in FIG. 3, the shutdown element 13 may be combined or connected in series with a device 15 having a pressure limiting or pressure reducing function for suppressing the occurrence of impermissibly high pressures in the second cooling loop 2, which may particularly damage the low temperature heat exchanger 10. Furthermore, shutdown element 13, equipped with and without the device for limiting or reducing pressure may be combined with a bypass line 17 provided on the input side of the coolant pump, as is schematically shown in FIG. 4. The shutdown element 13 is driven via signals which are generated by a vehicle control computer or engine controller (ECU) 14 in response to measured values which have been recorded by vehicle sensors.

Figure 2:
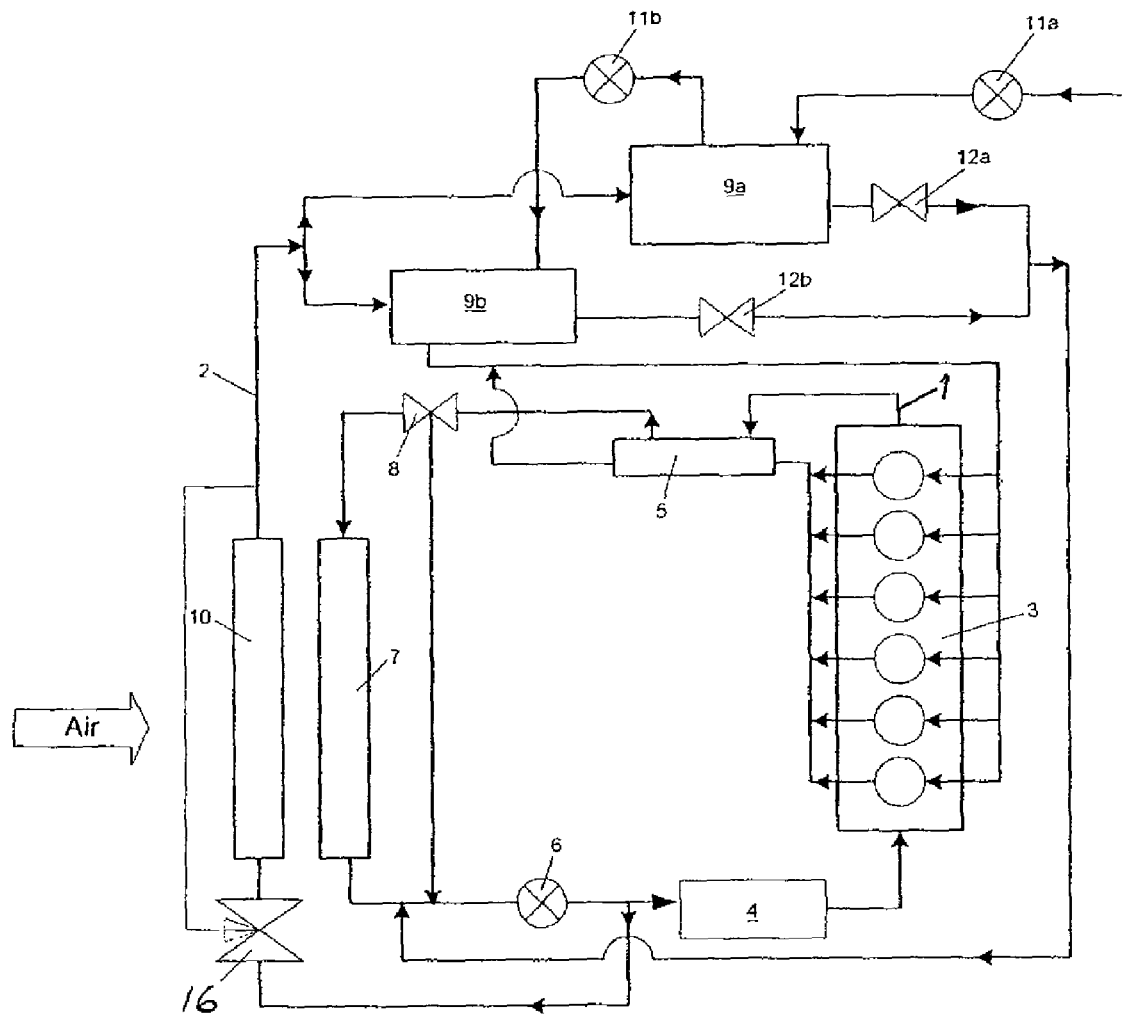
FIG. 2: shows a cooling system of the prior art having a high and a low temperature cooling loop without a shutdown element in the low temperature cooling loop.

In comparison to FIG. 1, FIG. 2 shows a cooling system as is known from the prior art. In FIG. 2, like numerals denote similar elements as in FIG. 1. In this embodiment of a cooling system, a bypass valve 16, for partially or entirely bypassing the low temperature heat exchanger 10, is located in the flow direction of the coolant in the second cooling loop 2 before the low temperature heat exchanger 10. This circuit variation thus also represent a possibility for allowing more rapid heating of the internal combustion engine or avoiding undesired cooling. In contrast to the present invention, the combination of a bypass valve with the appropriate conduit represents a comparatively high outlay. In addition, a bypass valve implemented as a three-way valve, in contrast to a blocking valve serving as a shutdown element as described above, will not prevent a minimum throughput on the main flow path.

The invention is not limited by the embodiments described above which are presented as examples only but can be modified in various ways within the scope of protection defined by the appended patent claims.

What is claimed:

1. A method of cooling an internal combustion engine of a vehicle having a charge air feed and a coolant throughput, the method comprising:
   charging the internal combustion engine with charge air via a charge air feed; circulating
   a coolant in a first and a second cooling loop, wherein said first cooling loop includes said internal combustion engine;
   operating the first cooling loop at a higher temperature than the second cooling loop;
   providing the charge air feed with at least one intercooling unit for transferring heat from the charge air to the second cooling loop in which said coolant throughput is controllable by a control unit; and
   shutting down the coolant throughput in the second cooling loop during the operation of the internal combustion engine as a function of one of an operating parameter of a vehicle component by the control unit, a state change of a vehicle component and an influencing variable being recorded by at least one sensor coupled to the control unit.

2. The method according to claim 1, wherein the vehicle component comprises at least one of the internal combustion engine, at least one of the cooling loops, and at least one component of an exhaust gas treatment system.

3. The method according to claim 1, wherein the influencing variable is ambient temperature.

4. A cooling system of an internal combustion engine of a vehicle having a charge air feed and a coolant throughput comprising:
   an engine controller;
   at least a sensor coupled to the engine controller
   a first and a second cooling loop, wherein said first cooling loop includes said internal combustion engine and is operated at a higher temperature than the second cooling loop;
   at least one intercooling unit for the charge air feed thermally connected to the second cooling loop, in which said coolant throughput is controllable by the engine controller;
   at least one shutdown element controlled by the engine controller and disposed in said second cooling loop operable to shut down to zero the coolant throughput during operation of the internal combustion engine as a function of at least one of an operating parameter of a vehicle component and an influencing variable being recorded by the at least one sensor.

5. The cooling system according to claim 4, wherein the vehicle component comprises the internal combustion engine; at least one of the cooling loops; and an exhaust gas treatment system.

6. The cooling system according to claim 5, wherein the charge air feed comprises a low-pressure compressor and a high-pressure compressor; and
   wherein the intercooling unit includes an intermediate cooler and a main cooler,
   said intermediate cooler is connected between the low-pressure compressor and the high-pressure compressor in the flow direction of the charge air; and
   said main cooler is connected downstream of said high-pressure compressor.

7. The cooling system according to claim 5, wherein said intercooling unit comprises at least one temperature sensor of said intercooling unit connected downstream in the flow direction of the coolant.

8. The cooling system according to claim 5, wherein said shutdown element is combined with one of a pressure reduction device and a pressure limiting device or is connected in series to one of a pressure reduction and pressure limiting valve.

9. The cooling system according to claim 4, wherein the charge air feed comprises a low-pressure compressor and a high-pressure compressor; and wherein the intercooling unit includes an intermediate cooler and a main cooler, said intermediate cooler being connected between the low-pressure compressor and the high-pressure compressor in the flow direction of the charge air; and said main cooler being connected downstream of said high-pressure compressor.

10. The cooling system according to claim 9, wherein said intercooling unit comprises at least one temperature sensor connected downstream of said intercooling unit in the flow direction of the coolant.

11. The cooling system according to claim 9, wherein said shutdown element is combined with one of a pressure reduction device and a pressure limiting device or is connected in series to one of a pressure reduction and pressure limiting valve.

12. The cooling system according to claim 4, wherein said intercooling unit comprises at least one temperature sensor connected downstream of said intercooling unit in the flow direction of the coolant.

13. The cooling system according to claim 12, wherein said shutdown element is combined with one of a pressure reduction device and a pressure limiting device or is connected in series to one of a pressure reduction and pressure limiting valve.

14. The cooling system according to claim 4, wherein said shutdown element is combined with one of a pressure reduction device and a pressure limiting device or is connected in series to one of a pressure reduction and pressure limiting valve.

* * * * *